United States Patent
Chung et al.

(10) Patent No.: US 9,469,339 B2
(45) Date of Patent: Oct. 18, 2016

(54) APPARATUS FOR CONTROLLING REAR WHEEL STEERING USING DRIVING BEHAVIOR SIGNAL FEEDBACK AND METHOD FOR THE SAME

(71) Applicant: Hyundai Motor Company, Seoul (KR)

(72) Inventors: Rae Wook Chung, Suwon-si (KR); Jun Wook Oh, Daegu (KR); Yang Soo Noh, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/928,186

(22) Filed: Oct. 30, 2015

(65) Prior Publication Data

US 2016/0167705 A1   Jun. 16, 2016

(30) Foreign Application Priority Data

Dec. 12, 2014   (KR) .......................... 10-2014-0179542

(51) Int. Cl.
*G06F 19/00* (2011.01)
*B62D 6/00* (2006.01)

(52) U.S. Cl.
CPC ..................... *B62D 6/005* (2013.01)

(58) Field of Classification Search
CPC .. B60W 10/12; B60W 10/18; B60W 30/045; B60W 10/04; B60W 10/16; B60W 2520/10
USPC .......................................................... 701/42
See application file for complete search history.

(56) References Cited

U.S. PATENT DOCUMENTS

| 5,267,160 | A | * | 11/1993 | Ito ............................ B62D 6/02 180/412 |
| 5,386,365 | A |   | 1/1995  | Nagaoka |
| 5,515,275 | A | * | 5/1996  | Ackermann ........... B62D 7/159 180/197 |
| 5,524,079 | A |   | 6/1996  | Ishida et al. |
| 6,092,882 | A | * | 7/2000  | Matsuno ............... B60T 8/1755 303/140 |

(Continued)

FOREIGN PATENT DOCUMENTS

| JP | 5-208681 A | 8/1993 |
| JP | 3065806 B2 | 7/2000 |

(Continued)

*Primary Examiner* — McDieunel Marc
(74) *Attorney, Agent, or Firm* — McDermott Will & Emery LLP

(57) ABSTRACT

An apparatus for controlling a rear wheel steering includes a sensor configured to detect a vehicle speed, a steering angle, yaw rate, and a lateral acceleration of a vehicle; a target yaw rate calculator configured to determine a target yaw rate from information detected by the sensor; a side slip angle estimator configured to estimate a side slip angle from information detected by the sensor; and a rear wheel steering angle control amount calculator configured to determine a rear wheel steering angle control amount by using the yaw rate information detected by the sensor, the target yaw rate calculated by the target yaw rate calculator, and the side slip angle estimated by the side slip angle estimator. The determined rear wheel steering angle control amount is implemented to control the vehicle yaw rate to follow the target yaw rate and the side slip angle to follow 0.

8 Claims, 3 Drawing Sheets

(56) References Cited

U.S. PATENT DOCUMENTS

| | | | | |
|---|---|---|---|---|
| 6,155,655 | A * | 12/2000 | Matsuno | B60T 8/1755 303/140 |
| 6,856,886 | B1 * | 2/2005 | Chen | B60T 8/172 303/146 |
| 7,672,765 | B2 * | 3/2010 | Moshchuk | B60W 30/04 180/197 |
| 7,797,094 | B2 * | 9/2010 | Miura | B60T 8/1755 180/197 |
| 8,548,706 | B2 * | 10/2013 | Miura | B60T 8/1755 303/146 |
| 9,237,324 | B2 * | 1/2016 | Lee | H04L 65/605 |
| 2007/0112474 | A1 * | 5/2007 | Chen | B60T 8/172 701/1 |
| 2009/0095562 | A1 * | 4/2009 | Yasui | B60W 30/045 180/412 |
| 2009/0157263 | A1 * | 6/2009 | Shin | B62D 5/0481 701/43 |
| 2014/0067205 | A1 * | 3/2014 | You | B62D 15/025 701/41 |

FOREIGN PATENT DOCUMENTS

| | | |
|---|---|---|
| JP | 2005-255170 A | 9/2005 |
| JP | 2010-179841 A | 8/2010 |
| JP | 2010-188978 A | 9/2010 |
| KR | 10-0847723 B1 | 7/2008 |
| KR | 10-2011-0120005 A | 11/2011 |
| KR | 10-2014-0073262 A | 6/2014 |

* cited by examiner

APPARATUS FOR CONTROLLING REAR WHEEL STEERING USING DRIVING BEHAVIOR SIGNAL FEEDBACK AND METHOD FOR THE SAME

CROSS-REFERENCE TO RELATED APPLICATION

This application claims under 35 U.S.C. §119(a) the benefit of priority to Korean Patent Application No. 10-2014-0179542 filed on Dec. 12, 2014, the entire contents of which are incorporated herein by reference.

TECHNICAL FIELD

The present invention relates to a method for controlling a rear wheel steering using driving behavior signal feedback, and more particularly, to a method for controlling a rear wheel steering angle by feeding back a driving behavior signal in real time in a vehicle on which a rear wheel steering (RWS) is mounted.

BACKGROUND

A rear wheel steering (RWS) is constituted by a motor, a decelerator, and a controller, and steers a rear wheel of a vehicle according to a driving situation of the vehicle to provide drivability and steerability.

In particular, the rear wheel steering (RWS) steers a rear wheel and a front wheel in opposite directions to each other in low-speed driving and steers the rear wheel in the same direction as the front wheel in high-speed driving, and as a result, a turning radius is reduced at a low speed and operating stability is improved.

FIG. 1 conceptually illustrates that the rear wheel operates in the rear wheel steering (RWS) and FIG. 2 illustrates a change of a gain depending on a vehicle speed in an example of controlling a steering angle of the rear wheel steering depending on the vehicle speed.

A most basic control method of the rear wheel steering is a method that controls phases of a front steering angle and a rear steering angle according to the vehicle speed as illustrated in FIG. 1.

That is, as illustrated in FIG. 1, a basic concept is that the rear wheel is steered in an opposite direction to the front wheel at the low speed and the rear wheel is steered in the same direction as the front wheel at the high speed.

In this regard, the size of the rear wheel steering angle is determined by applying Equation X given below and a gain used in Equation X varies as illustrated in FIG. 2 according to the vehicle speed. The gain in Equation X can be calculated from the assumption that a steady state side slip of the vehicle is 0.

Rear wheel steering angle=gain×front wheel steering angle  [Equation X]

However, the rear wheel steering angle control method in the related art as a feed-forward method that does not feedback the driving behavior signal but controls the driving behavior signal only by the front wheel steering may have a problem in that robustness deteriorates against a change in control environment such as a road surface condition and a vehicle weight.

Yet another control method as a method that feeds back yaw rate and uses the yaw rate in controlling the rear wheel steering angle controls the rear wheel steering angle by Equation Y given below.

Rear wheel steering angle=(gain 1×front wheel steering angle)+(gain 2×yaw rate)  [Equation Y]

Gain 1 and gain 2 used herein may be calculated from the assumption that the side slip is 0 in both a steady state and a transient state.

The control method feeds back a yaw rate signal to minimize the side slip and can acquire a more excellent side slip reduction effect than the method according to Equation X through the feedback of the yaw rate signal, but has a limit in controlling the yaw rate itself except for the side slip.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with prior art and to provide a method for controlling a rear wheel steering angle that feeds back a driving behavior signal in a vehicle having a rear wheel steering (RWS) mounted thereon in real time to minimize a side slip angle of the vehicle and stabilize a yaw rate behavior.

In one aspect, the present disclosure provides an apparatus for controlling a rear wheel steering using driving behavior signal feedback including: a sensor detecting a vehicle speed, a steering angle, yaw rate, and a lateral acceleration of a vehicle; a target yaw rate calculator configured to determine a target yaw rate from the vehicle speed and the steering angle information detected by the sensor; a side slip angle estimator configured to estimate a slide slip angle from the vehicle speed, yaw rate, and lateral acceleration information detected by the sensor; and a rear wheel steering angle control amount calculator configured to determine a rear wheel steering angle control amount by using the yaw rate information detected by the sensor, the target yaw rate calculated by the target yaw rate calculator, and the side slip angle estimated by the side slip angle estimator. The rear wheel steering angle control amount calculator is configured to implement the rear wheel steering angle control amount to control the vehicle yaw rate to follow the target yaw rate and the side slip angle to follow 0.

In another aspect, the present disclosure provides a method for controlling a rear wheel steering using driving behavior signal feedback, including: detecting vehicle behavior data including a vehicle speed, a steering angle, yaw rate, and a lateral acceleration of a vehicle; determining a target yaw rate from the detected vehicle speed and steering angle information and estimating a side slip angle from the detected vehicle speed, yaw rate, and lateral acceleration information; and determining a rear wheel steering angle control amount by using the detected yaw rate information, the calculated target yaw rate, and the estimated side slip angle, and in the step of determining the rear wheel steering angle control amount, the rear wheel steering angle control amount is implemented to control the vehicle yaw rate to follow the target yaw rate and the side slip angle to follow 0.

An apparatus for controlling a rear wheel steering using driving behavior signal feedback and a method for the same according to the present disclosure can achieve the following effects.

First, in certain embodiments, a behavior signal of a vehicle is fed back in real time to be reflected to calculation of a control amount of a rear wheel steering angle of the rear wheel steering to perform a control suitable for a vehicle behavior which is actually generated, thereby implementing excellent yaw rate and side slip control performance.

Second, robustness of the control performance can be secured in spite of changes in control conditions such as a change in road surface condition, a change in vehicle weight, and the like through a feedback control.

Third, yaw rate and a side slip angle can be simultaneously controlled.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of embodiments of the present invention will now be described in detail with reference to certain exemplary embodiments thereof illustrated the accompanying drawings which are given hereinbelow by way of illustration only, and thus are not limitative of the present invention, and wherein.

Figure 1:
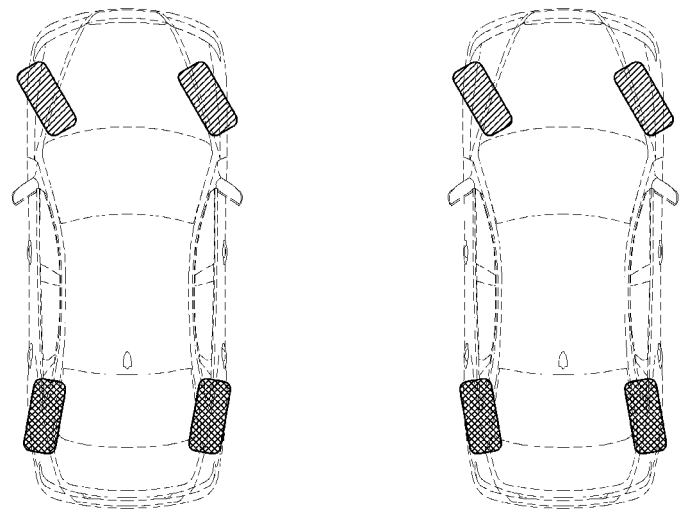
FIG. 1 conceptually illustrating that a rear wheel operates in a rear wheel steering (RWS)
Figure 2:
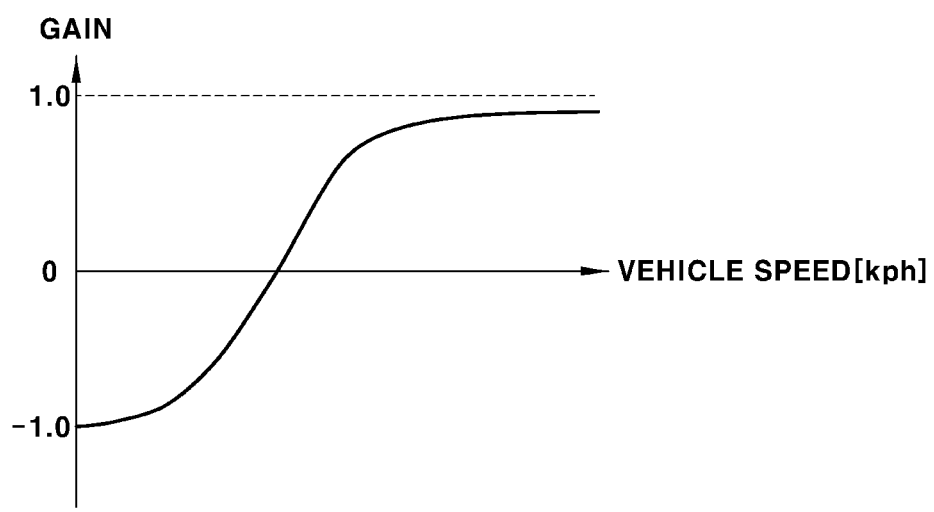
FIG. 2 illustrates a change in gain depending on a vehicle speed in an example of controlling a steering angle of the rear wheel steering (RWS) depending on the vehicle speed.

It should be understood that the appended drawings are not necessarily to scale, presenting a somewhat simplified representation of various preferred features illustrative of the basic principles of embodiments of the invention. The specific design features of embodiments of the present invention as disclosed herein, including, for example, specific dimensions, orientations, locations, and shapes will be determined in part by the particular intended application and use environment.

In the figures, reference numbers refer to the same or equivalent parts of embodiments of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In the specification, embodiments of the present invention have been described in detail based on an implementation example so as for those skilled in the art to easily execute embodiments of the present invention, but the present invention is not limited to the preferable implementation example and it should be realized that the present invention includes various embodiments without departing from the scope of the disclosed technology.

Hereinafter, an apparatus for controlling a rear wheel steering using driving behavior signal feedback according to an implementation example of an embodiment of the present invention and a method for the same will be described in detail with reference to the accompanying drawings.

Figure 3:
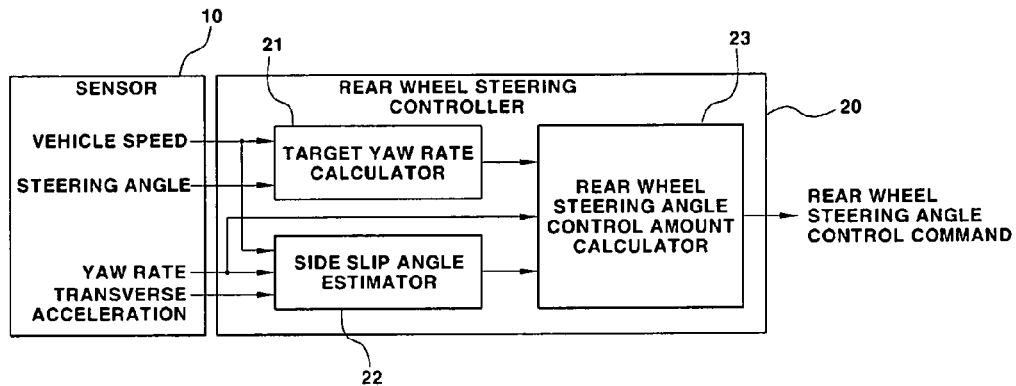
FIG. 3 illustrates a preferable one implementation example of an apparatus for controlling the rear wheel steering using driving behavior signal feedback according to an embodiment of the present invention.

FIG. 3 conceptually illustrates one implementation example of an apparatus for controlling a rear wheel steering using driving behavior signal feedback according to an embodiment of the present invention.

As illustrated in FIG. 3, in the implementation example of the embodiment of the present invention, the apparatus is configured to include a sensor 10 detecting various pieces of information associated with a vehicle behavior and a rear wheel steering controller 20 deciding a rear wheel steering angle control amount through the collection collected by the sensor 10.

The sensor 10, which detects information associated with a basic vehicle behavior required to decide the rear wheel steering angle control amount, may be configured to detect a vehicle speed, a steering angle, yaw rate, and a lateral acceleration of a vehicle.

Meanwhile, the detected vehicle speed, steering angle, yaw rate, and lateral acceleration information of the vehicle are provided to the rear wheel steering controller 20 and used to decide the rear wheel steering angle control amount therethrough.

In detail, the rear wheel steering controller 20 is configured to include a target yaw rate calculator 21, a side slip angle estimator 22, and a rear wheel steering angle control amount calculator 23.

The target yaw rate calculator 21 calculates target yaw rate by using the information from the sensor 10 and the slide slip angle estimator 22 decides an estimated side slip angle by using the information from the sensor 10.

Meanwhile, the rear wheel steering angle control amount calculator 23 is configured to calculate the rear wheel steering angle control amount for determining a rear wheel angle by using the calculated target yaw rate and the estimated side slip angle.

Figure 4:
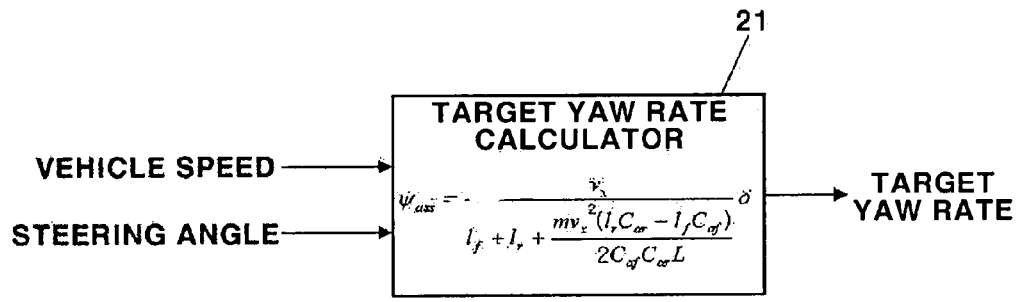
FIG. 4 conceptually illustrates a target yaw rate calculator.
Figure 5:
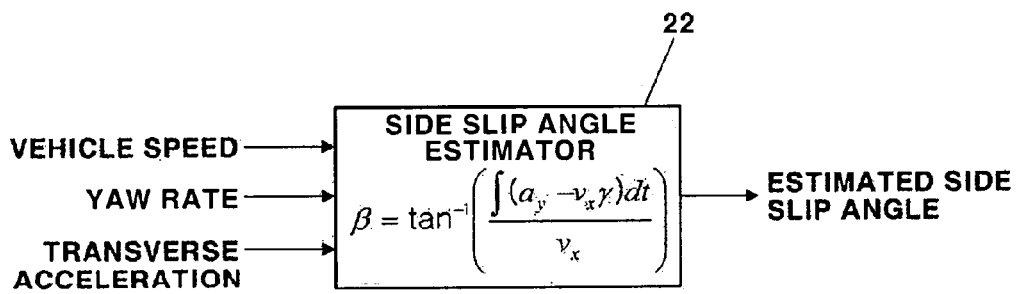
FIG. 5 conceptually illustrates a side slip angle estimator.
Figure 6:
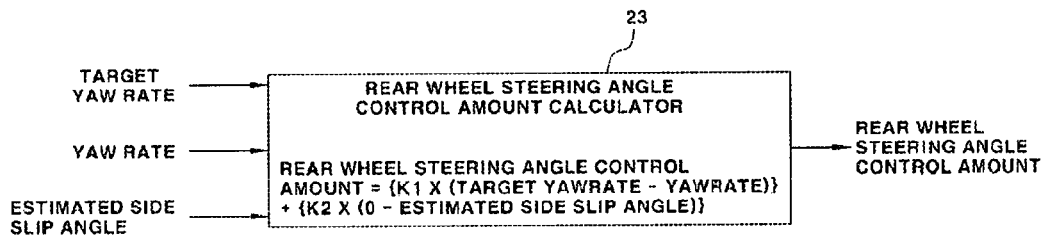
FIG. 6 conceptually illustrates a rear wheel steering angle calculator.

Certain embodiments of a calculation process of the respective components constituting the rear wheel steering controller 20 are illustrated in detail in FIGS. 4 to 6.

First, FIG. 4 conceptually illustrates a calculation process in the target yaw rate calculator 21.

That is, in certain embodiments, the target yaw rate calculator 21 receives the vehicle speed and steering angle information to calculate the target yaw rate by Equation 1 given below.

$$\dot{\psi}_{des} = \frac{v_x}{l_f + l_r + \frac{mv_x^2(l_r C_{ar} - l_f C_{af})}{2C_{af}C_{ar}L}}\delta \qquad \text{[Equation 1]}$$

Where, $v_x$ represents the vehicle speed, $L_f$ represents a distance from a vehicle weight center to a front wheel shaft, $L_r$ represents a distance from the vehicle weight center to a rear wheel shaft, m represents vehicle mass, $C_{af}$ represents cornering stiffness of a front wheel tire, $C_{ar}$ represents cornering stiffness of a rear wheel tire, L represents wheel base distance, and $\delta$ represents a front wheel steering angle.

Therefore, the target yaw rate calculator 21 calculates a target yaw rate value that intends to follow the yaw rate generated in the vehicle.

Meanwhile, FIG. 5 conceptually illustrates the side slip angle estimator.

As illustrated in FIG. 5, in certain embodiments, the side slip angle estimator 22 estimates the side slip angle by using Equation 2 given below from the vehicle speed, yaw rate, and lateral acceleration information.

$$\beta = \tan^{-1}\left(\frac{\int (a_y - v_x \gamma) dt}{v_x}\right) \qquad \text{[Equation 2]}$$

Where, $\beta$ represents the side slip angle, $a_y$ represents the lateral acceleration, $v_x$ represents the vehicle speed, and $\gamma$ represents the yaw rate.

Therefore, the side slip angle estimator 22 estimates the side slip angle of a current vehicle and uses the estimated side slip angle to calculate the rear wheel steering angle control amount.

In this regard, FIG. 6 conceptually illustrates that the rear wheel steering angle controller determines the rear wheel steering angle control amount.

As illustrated in FIG. 6, the rear wheel steering angle control amount is determined from the target yaw rate calculated from the target yaw rate calculator 21, the yaw rate detected by the sensor 10, and the side slip angle estimated by the side slip angle estimator 22 and the rear steering angle control amount is determined, in certain embodiments, by Equation 3 given below.

Rear wheel steering angle control amount=$K1\times$(target yaw rate−yaw rate)+$K2\times$(0−estimated side slip angle) [Equation 3]

Where, K1 and K2 are gains for the yaw rate and the side slip angle and the gains K1 and K2 are constants of which values may be adjusted through tuning in an actual vehicle.

Referring to Equation 3 given above, in certain embodiments, the rear wheel steering angle control amount is calculated as the sum of a value acquired by a difference between the target yaw rate and current yaw rate detected by the sensor 10 by the gain K1 and a value acquired by a difference between 0 and the estimated side slip angle by K2 as shown in a left equation.

The generation of the yaw rate of the vehicle may be controlled to be approximate to the target yaw rate through such a method and the side slip angle may be simultaneously controlled to be approximate to 0.

That is, the rear wheel steering angle control amount calculator determines the rear steering angle control amount to allow the vehicle yaw rate to follow the target yaw rate and the side slip angle to follow 0 and the rear wheel steering angle is controlled according to the decided rear wheel steering angle control amount to implement excellent yaw rate and side slip control performance according to the vehicle behavior.

In particular, in certain embodiments, the rear wheel steering angle control amount calculator 23 performs a feedback control using detection data associated with the vehicle behavior, and the target yaw rate and estimated side slip angle calculated therefrom to secure sufficient control performance in spite of changes in control conditions such as a road surface condition or a vehicle weight.

Herein, the gains K1 and K2 as factors which are variable in terms of a design may adopt values selected by considering a design weight for the yaw rate control and the side slip control.

Moreover, according to another implementation example of the present invention, the feedback control using a vehicle behavior signal according to an embodiment of the present invention may be applied together with a feed-forward scheme that controls steering angles of a front wheel and a rear wheel in an in-phase or a reverse phase by the front wheel steering angle and the vehicle speed.

In this case, after an in-phase/reverse phase control by the vehicle speed and the front wheel steering angle, a control signal of the rear wheel steering angle is configured to be feedback-controlled by Equation 3.

Figure 7:
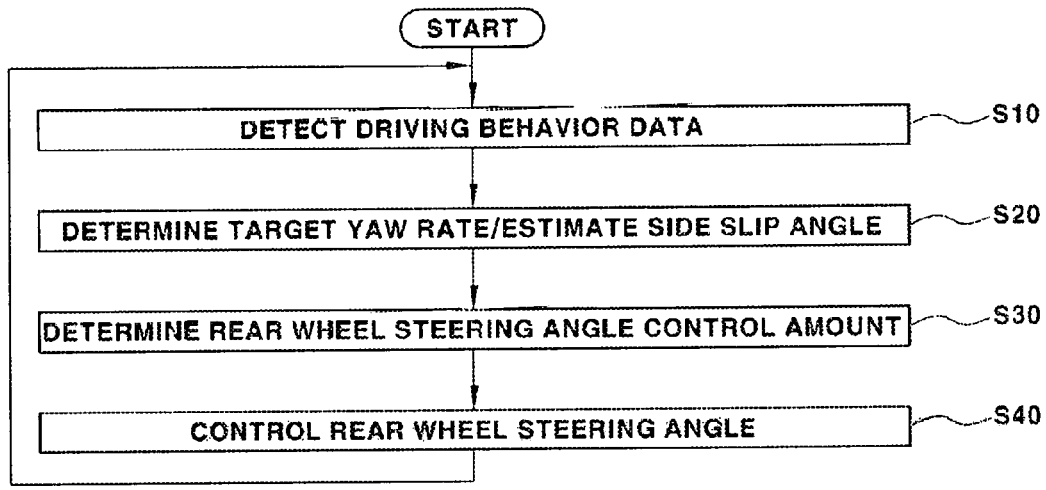
FIG. 7 illustrates a preferable one implementation example of a method for controlling a rear wheel steering using driving behavior signal feedback according to an embodiment of the present invention.

FIG. 7 illustrates a preferable one implementation example of a method for controlling a rear wheel steering using driving behavior signal feedback according to an embodiment of the present invention.

As illustrated in FIG. 7, in an embodiment of the present invention, the method includes detecting vehicle behavior data (S10), determining target yaw rate and an estimated side slip angle (S20), and determining a rear wheel steering angle control amount from the information (S30).

When a rear wheel steering angle control amount is determined through the steps, the rear wheel steering angle is controlled according to the decided rear wheel steering angle control amount (S40).

After the rear wheel angle control, in certain embodiments, the process returns to detecting the vehicle behavior data again to repeat steps S10 to S40.

In the above steps, determining the target yaw rate and the estimated side slip angle has been described above by using Equations 1 and 2 as an example and deciding the rear wheel steering angle control amount has been described above by using Equation 3 as an example.

Although the present invention has been described with reference to various embodiments, those skilled in the art will appreciate that various modifications and changes can be made, within the range without departing from the scope of the invention as disclosed in the accompanying claims. Further, many changes of particular situations or materials can be made within the scope without departing from an essential area of the present invention. Therefore, the present invention is not limited to a detailed description of the embodiments of the present invention and will include all embodiments within the scope of the appended claims.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An apparatus for controlling a rear wheel steering using driving behavior signal feedback, the apparatus comprising:

a sensor configured to detect a vehicle speed, a steering angle, a vehicle yaw rate, and a lateral acceleration of a vehicle;

a target yaw rate calculator configured to determine a target yaw rate from the vehicle speed and the steering angle information detected by the sensor;

a side slip angle estimator configured to estimate a side slip angle from the vehicle speed, yaw rate, and lateral acceleration information detected by the sensor; and a rear wheel steering angle control amount calculator configured to determine a rear wheel steering angle control amount by using the yaw rate information detected by the sensor, the target yaw rate calculated by the target yaw rate calculator, and the side slip angle estimated by the side slip angle estimator, wherein the rear wheel steering angle control amount calculator is configured to implement the determined rear wheel steering angle control amount to control the vehicle yaw rate to follow the target yaw rate and the side slip angle to follow 0.

2. The apparatus of claim 1, wherein the rear wheel steering angle control amount calculator is configured to determine the rear wheel steering angle control amount by applying Equation 3:

Rear wheel steering angle control amount=$K1$×(target yaw rate−yaw rate)+$K2$×(0−estimated side slip angle), wherein $K1$ and $K2$ are constants.

3. The apparatus of claim 1, wherein the target yaw rate calculator is configured to determine the target yaw rate by applying Equation 1:

$$\dot{\psi}_{des} = \frac{v_x}{l_f + l_r + \frac{mv_x^2(l_rC_{ar} - l_fC_{af})}{2C_{af}C_{ar}L}} \delta,$$

wherein $v_x$ represents the vehicle speed, $L_f$ represents a distance from a vehicle weight center to a front wheel shaft, $L_r$ represents a distance from the vehicle weight center to a rear wheel shaft, m represents vehicle mass, $C_{af}$ represents cornering hardness of a front wheel tire, $C_{ar}$ represents cornering hardness of a rear wheel tire, L represents an inter-shaft distance, and $\delta$ represents a front wheel steering angle.

4. The apparatus of claim 1, wherein the side slip angle estimator is configured to estimate the side slip angle by applying Equation 2:

$$\beta = \tan^{-1}\left(\frac{\int (a_y - v_x\gamma)dt}{v_x}\right),$$

wherein $\beta$ represents the side slip angle, $\alpha_y$ represents the lateral acceleration, $v_x$ represents the vehicle speed, and $\gamma$ represents the yaw rate.

5. A method for controlling a rear wheel steering using driving behavior signal feedback, the method comprising:

detecting vehicle behavior data including a vehicle speed, a steering angle, a yaw rate, and a lateral acceleration of a vehicle;

determining a target yaw rate from the detected vehicle speed and steering angle information and estimating a side slip angle from the detected vehicle speed, yaw rate, and lateral acceleration information; and determining a rear wheel steering angle control amount by using the detected yaw rate information, the calculated target yaw rate, and the estimated side slip angle, wherein in the step of determining the rear wheel steering angle control amount, the determined rear wheel steering angle control amount is implemented to control the vehicle yaw rate to follow the target yaw rate and the side slip angle to follow 0.

6. The method of claim 5, wherein in the step of determining the rear wheel steering angle control amount, the rear wheel steering angle control amount is determined by applying Equation 3:

Rear wheel steering angle control amount=$K1$×(target yaw rate−yaw rate)+$K2$×(0−estimated side slip angle), wherein $K1$ and $K2$ are constants.

7. The method of claim 5, wherein in the step of determining the target yaw rate and estimating the side slip angle, the target yaw rate is determined by applying Equation 1:

$$\dot{\psi}_{des} = \frac{v_x}{l_f + l_r + \frac{mv_x^2(l_rC_{ar} - l_fC_{af})}{2C_{af}C_{ar}L}} \delta,$$

wherein $v_x$ represents the vehicle speed, $L_f$ represents a distance from a vehicle weight center to a front wheel shaft, $L_r$ represents a distance from the vehicle weight center to a rear wheel shaft, m represents vehicle mass, $C_{af}$ represents cornering hardness of a front wheel tire, $C_{ar}$ represents cornering hardness of a rear wheel tire, L represents an inter-shaft distance, and $\delta$ represents a front wheel steering angle.

8. The method of claim 5, wherein in the step of determining the target yaw rate and estimating the side slip angle, the estimated side slip angle is estimated by applying Equation 2:

$$\beta = \tan^{-1}\left(\frac{\int (a_y - v_x\gamma)dt}{v_x}\right),$$

wherein $\beta$ represents the side slip angle, $\alpha_y$ represents the lateral acceleration, $v_x$ represents the vehicle speed, and $\gamma$ represents the yaw rate.

* * * * *